United States Patent Office 2,768,141
Patented Oct. 23, 1956

2,768,141

NONINFLAMMABLE HYDRAULIC FLUIDS

Theodore W. Langer, Buffalo, N. Y., and John M. Russ, Jr., Old Greenwich, Conn., assignors to Union Carbide and Carbon Corporation, a corporation of New York No Drawing. Application October 24, 1952,
Serial No. 316,796

6 Claims. (Cl. 252—73)

The invention relates to fluid compositions for use in devices and systems for transmitting of mechanical energy by fluid pressure, including such as hydraulic brake systems, shock absorbers, clutches, and aircraft and ship control mechanisms. It is particularly concerned with noninflammable hydraulic fluids derived from a base composition of water and glycol compounds, and which have been designated in the art as hydrolube fluids.

The better-known hydrolube fluids are comprised of the common glycols or glycol ethers mixed with water, the latter in sufficient amounts to impart flame-retardant properties in the blended liquid. To this aqueous solution thickening agents are added, to provide, and control, desired viscosity characteristics, and inhibitors for repressing corrosion, oxidation and frictional wear are generally included in relatively small proportions. Readily available glycols, such as ethylene glycol, diethylene and triethylene glycol, propylene glycol and butylene glycol have been preferred as the base fluid. These blend easily with water in proportions which can be controlled—usually to not over 50% by volume of water—in order to balance the noninflammability property of the resulting mixture, with a likewise desirable low freezing point.

The function of the thickening agent employed in these fluids is one of extreme importance, in that it is through the medium of this component that the essential viscosity-temperature characteristics in the final fluid are accomplished and maintained. Three very important properties productive of a good thickening agent are (1) it should give an effective thickening action at low concentrations (2) it should maintain a minimum change in viscosity in the fluid over a wide temperature range, and (3) it must be substantially, or preferably entirely, free from tendency to separate at low temperatures and at moderately elevated temperatures. Many kinds of thickening materials have, heretofore, been proposed, and used, in hydraulic fluids, but there still continues to be a need for thickeners which are more constant in the aforesaid properties, under the widely varied, and severe, service conditions of the hydrolube-type fluids.

It is, therefore, the object of this invention to provide new and improved thickening agents for noninflammable hydraulic fluids, which will impart to the finally blended products, and maintain therein, the temperature-viscosity characteristics essential to the most demanding conditions of use of these fluids.

The thickening materials proposed by the invention cannot be too accurately identified by their true and complete chemical structure, but they are derived by reactions of a character basically similar to others known in the chemical art. The thickeners are addition products formed by a caustic-catalyzed reaction of an alkylated phenol sequentially with 1,2-propylene oxide and ethylene oxide, and they are essentially complex mixtures of monohydroxy polyoxyalkylene monoethers having overall polyoxyalkylene chains of different lengths, with the alkyl phenol radical of the starting material attached to a propoxy chain which is in turn attached to an ethoxy chain with a terminal hydroxyl. Certain factors in the reaction must, however, be closely controlled in order to obtain in the addition product a maximum effectiveness in the thickening function. The alkyl phenol starter must be one of relatively high molecular weight, in which the alkyl chain, for example, contains eight or more carbon atoms. This includes starting compounds such as nonylphenol, dodecylphenol, tetradecylphenol, heptadecylphenol and corresponding cresol derivatives. The relative proportions of added oxide units is also important, and this should be controlled so that approximately twice as much ethylene oxide as propylene oxide is used in the reaction. As already indicated, the reaction is conducted step-wise, and the propylene oxide is reacted first with the alkyl phenol starter, the amount of this oxide used being in a mol ratio of approximately 40% to 60% of the number of carbon atoms in the alkyl chain of the starting material. Many tests have shown that too much or too little of either oxide yields an inferior product, and this is also true if the oxides are added in mixture, or if the order of addition is reversed, so that a propoxy chain, rather than one of ethoxy structure, forms the hydroxyl terminal grouping in the completely reacted product.

As a more specific example, an excellent thickening agent has been made by reacting, with moderate heating, and in the presence of a caustic catalyst, one mol of nonylphenol with five mols of propylene oxide. After completion of this reaction eleven mols of ethylene oxide were added and the reaction was continued until all of the latter oxide had been combined. The final product was a clear viscous liquid which in mixture with aqueous glycol solutions imparted excellent temperature-viscosity characteristics. Using a starter of dodecyl phenol in a similar reaction, ratios of the oxides of six mols of propylene oxide to twelve or thirteen mols of ethylene oxide gave very good thickeners. With the higher alkyl phenols the same relative ratio of reactants was found best suited to produce the desirable thickening function in the product.

The essential characteristics desired in a hydrolube fluid which is to be used for military aircraft are as follows:

Viscosity, centistokes:
    At 130° F_____ 10.0, minimum.
    At −40° F_____ 650.0, maximum, preferably below 550.
Freezing point_____ −60° F., maximum.
Separation temperature_____ 160° F., minimum.
Metal corrosion_____ No significant corrosion of steel, aluminum, bronze, brass, copper, magnesium or cadmium plated steel.

Many hydraulic fluid compositions employing the thickeners here proposed have been formulated, which meet completely with the above requirements, or if not squarely within these specifications, are entirely suitable for many industrial uses. The properties of a few of these are shown in the following table:

| Thickener | | | | Properties of Mixture in 60:40 Ethylene Glycol Water Solution | | |
| --- | --- | --- | --- | --- | --- | --- |
| Alkyl Phenol Starter | Number of Propoxy Units First Added Per Mole Starter | Number of Terminal Ethoxy Units Per Mole Starter | Conc. of Thickener, percent by wt. | Viscosity, Centistokes | | Separation Temperature, °F. |
| | | | | at 130° F. | at −40° F. | |
| Nonylphenol | 4 | 10 | 15 | 14.9 | 712 | 160 |
| Do | 5 | 10 | 15 | 15.7 | 765 | 176 |
| Do | 5 | 10 | 13 | 11.0 | 573 | 175 |
| Do | 4 | 10 | 12 | 10.5 | 482 | 162 |
| Do | 5 | 12 | 15 | 14.7 | 733 | 176 |
| Dodecylphenol | 6 | 12 | 7.5 | 26.5 | 290 | 144 |
| Do | 6 | 13 | 10 | 15.0 | 390 | 172 |
| Do | 6 | 14 | 12 | 11.3 | 535 | 190 |
| Do | 6 | 12 | 11.5 | 48.5 | 465 | 148 |
| Do | 6 | 12 | 9.5 | 43.4 | 366 | 146 |
| Tetradecylphenol | 7 | 14 | 9 | 16.3 | | 170 |
| | | | | at 100° F. | | |
| Do | 7 | 14 | 13 | 34.8 | | 170 |
| Heptadecylphenol | 9 | 19 | 13 | 128 | | 160 |

As the above table will indicate the actual amount of thickener necessary to obtain the effects desired can be varied considerably, and differing amounts will have to be used, depending upon the nature, and relative proportions, of the other components in the completely blended fluid. Overall amounts of the thickener varying from about 5.0% to 50.0% have been found operative for the purpose intended. In all the tests shown in the table a 60% by weight aqueous ethylene glycol solution constituted the base fluid, as this particular blend has been used extensively to provide a fluid mixture having a freezing point below −60° F. Modification in these proportions can also be made to suit intended uses. At least 15% water is usually desired in the final blend to assure reasonable non-flammability, and the preferred glycol amounts are determined to large extent by the required anti-freeze protection, which with ethylene glycol will reach a maximum in the neighborhood of about a 65% solution. As little as 15% glycol may be suitable where the very low freezing point is not important.

In the finally formulated hydrolube fluids it is common practice to include, in minor amounts, one or more additive materials, which function essentially as inhibiting agents against corrosion, oxidation, frictional wear, and other factors. Typical of these are mahogany soaps, or petroleum sulphonates, and fatty acid soaps, which are generally considered as anti-wear agents, morpholine and other amines, which are known to be rust inhibitors, and other corrosion inhibitors like metal and organic nitrite salts. Any of the generally-known inhibitor-type additives, and combinations of them, may be found useful with the fluids here proposed, and it is within the intent of this invention to include with the base components specified any additive formulations which may be found suitable.

We claim:

1. A non-inflammable hydraulic fluid consisting essentially of a base mixture of water and from about 15% to 65% by weight of a low molecular weight glycol, and containing a thickener in amount of 5% to 50% by weight, said thickener being composed of the addition product formed by the caustic-catalyzed sequential reaction, at an elevated temperature, of an alkyl phenol containing at least eight carbon atoms in the alkyl group first with 1,2-propylene oxide in a mol proportion of about 40% to 60% of the number of carbon atoms in the aforesaid alkyl group, and secondly with ethylene oxide in mol proportions about twice that of the 1,2-propylene oxide.

2. A non-inflammable hydraulic fluid consisting essentially of a base mixture of water and a low molecular weight glycol in proportions of about 40% to 60% by weight, and containing a thickener in an amount of about 7% to 15% by weight, said thickener being composed of the addition product formed by the caustic-catalyzed sequential reaction, at an elevated temperature, of an alkyl phenol containing at least eight carbon atoms in the alkyl group first with 1,2-propylene oxide in a mol proportion of about 40% to 60% of the number of carbon atoms in the aforesaid alkyl group, and secondly with ethylene oxide in mol proportions about twice that of the 1,2-propylene oxide.

3. A non-inflammable hydraulic fluid consisting essentially of a base mixture of water and ethylene glycol in proportions of about 40% to 60% by weight, and containing a thickener in an amount of about 7% to 15% by weight, said thickener being composed of the addition product formed by the caustic-catalyzed sequential reaction, at an elevated temperature, of one mol of nonylphenol first with about five mols of 1,2-propylene oxide, and secondly with about eleven mols of ethylene oxide.

4. A non-inflammable hydraulic fluid consisting essentially of a base mixture of water and ethylene glycol in proportions of about 40% to 60% by weight, and containing a thickener in an amount of about 7% to 15% by weight, said thickener being composed of the addition product formed by the caustic-catalyzed sequential reaction, at an elevated temperature, of one mol of dodecylphenol first with about six mols of 1,2-propylene oxide, and secondly with about twelve mols of ethylene oxide.

5. A non-inflammable hydraulic fluid consisting essentially of a base mixture of water and ethylene glycol in proportions of about 40% to 60% by weight, and containing a thickener in an amount of about 7% to 15% by weight, said thickener being composed of the addition product formed by the caustic-catalyzed sequential reaction, at an elevated temperature, of one mol of tetradecylphenol first with about seven mols of 1,2-propylene oxide, and secondly with about fourteen mols of ethylene oxide.

6. A non-inflammable hydraulic fluid consisting essentially of a base mixture of water and ethylene glycol in proportions of about 40% to 60% by weight, and containing a thickener in an amount of about 7% to 15% by weight, said thickener being composed of the addition product formed by the caustic-catalyzed sequential reaction, at an elevated temperature, of one mol of heptadecylphenol first with about nine mols of 1,2-propylene oxide, and secondly with about nineteen mols of ethylene oxide.

References Cited in the file of this patent

UNITED STATES PATENTS

| | | |
|---|---|---|
| 2,462,694 | Walker | Feb. 22, 1949 |
| 2,602,780 | Zisman et al. | July 8, 1952 |

FOREIGN PATENTS

| | | |
|---|---|---|
| 470,181 | Great Britain | Aug. 3, 1937 |